United States Patent [19]

Reinhardt et al.

[11] 4,203,964
[45] May 20, 1980

[54] RE-EXTRACTING METAL CHLORIDE COMPLEX FROM AN ORGANIC EXTRACTION SOLUTION

[75] Inventors: Hans Reinhardt; Ulf V. Kuylenstierna, both of Västra Frälunda, Sweden

[73] Assignee: MX-Processer Reinhardt & Co. AB, Mölindal, Sweden

[21] Appl. No.: 921,177

[22] Filed: Jul. 3, 1978

[30] Foreign Application Priority Data

Jul. 20, 1977 [SE] Sweden .............................. 7708387
Dec. 14, 1977 [SE] Sweden .............................. 7714219

[51] Int. Cl.$^2$ .................... C01B 17/96; C01B 7/01
[52] U.S. Cl. .................... 423/658.5; 423/24; 423/89; 423/100; 423/139; 423/488; 423/544; 423/DIG. 14; 423/DIG. 1; 134/10; 75/101 BE
[58] Field of Search ............ 423/24, 54, 63, 64, 423/70, 89, 100, 112, 139, 488, 481, 1, 658.5; 75/101 BE; 423/DIG. 1, 554, 557; 203/35, 48

[56] References Cited

U.S. PATENT DOCUMENTS

| | | | |
|---|---|---|---|
| 2,950,170 | 8/1960 | Harnisch et al. | 423/488 |
| 3,870,060 | 3/1975 | Liljenzin et al. | 423/488 |
| 3,932,579 | 1/1976 | Morgan | 423/49 |
| 3,988,224 | 10/1976 | Barriere | 423/24 |

OTHER PUBLICATIONS

Reinhardt "Solvent Extraction for Recovery of Metal Waste" *Chemistry and Industry* Mar. 1, 1975 pp. 210-213.

*Primary Examiner*—Brian E. Hearn
*Attorney, Agent, or Firm*—Burns, Doane, Swecker & Mathis

[57] ABSTRACT

The invention relates to the re-extraction of a metal from an organic extraction solution in which the metal is present as a metal chloride complex bonded to an extractant. The organic extraction solution is contacted with an aqueous solution, to transfer metal ions and chloride ions to the aqueous solution. Sulphuric acid is added to the aqueous solution, which is subsequently heated to drive off hydrogen chloride and water. Metal sulphate is removed from the acidified aqueous solution.

7 Claims, 3 Drawing Figures

RE-EXTRACTING METAL CHLORIDE COMPLEX FROM AN ORGANIC EXTRACTION SOLUTION

The invention relates to a process for re-extraction of a metal from an organic extraction solution in which the metal is present as a metal chloride complex which is bonded to an extractant. An example of an organic extraction solution, which can be treated according to the invention, is a kerosene solution of an organic amine or phosphorous compound. Such a solution can, for example, have been used to extract metals from an acidic chloride-bearing aqueous solution. It is known that in such extraction processes certain metals migrate into the organic solution in the form of metal chloride complexes.

It is the general object of the invention to provide an improved re-extraction process including contacting the organic extraction solution with an aqueous solution to transfer metal ions and chloride ions to the aqueous solution, and to produce hydrochloric acid and metal sulphate from said aqueous solution. It is a particular object of the invention to provide an improved re-extraction process in which the aqueous solution referred to above can be recirculated after the separation of chloride and metal ions. It is another particular object of the invention to provide an improved re-extraction process working with a low consumption of chemicals.

The process of the invention is characterized in contacting the organic extraction solution with an aqueous solution to transfer metal ions and chloride ions to the aqueous solution, adding a sulphuric acid solution to the aqueous solution, before or after the contact with the organic extraction solution, heating the thusly acidified aqueous solution to drive off hydrogen chloride and water, and removing metal sulphate from the acidified aqueous solution before or after driving off hydrogen chloride and water.

As examples of metals, which can be re-extracted according to this embodiment of the invention, can be mentioned all the metals which are extracted when the chloride ion content is low, e.g. zinc, iron(III) and cadmium, but the invention can also be used to advantage for the metals which are extracted when the content of chloride ions is high, e.g. lead, coppoer, cobalt and iron(III).

The chemical process in extraction and re-extraction can be illustrated by some formulae, where a tertiary amine is used as an example of an extractant.

In extraction the following process can take place:

$$MeCl_4^{2-} + 2R_3NH.Cl_{(org)} \rightleftharpoons (R_3NH)_2MeCl_{4(org)} + 2Cl^- \quad (1)$$

Me denotes a divalent metal. R represents an alkyl residue with sufficient carbon atoms for the amine to become substantially insoluble in water. It is assumed that the amine in the organic extraction solution is present as a chloride salt, $R_3NH.Cl$.

If the organic extraction solution, containing the amine metal chloride complex, is contacted by an aqueous solution with a low chloride content, the complex will split up and the metal is reextracted by the reaction:

$$(R_3NH)_2MeCl_{4(org)} \rightleftharpoons 2R_3NHCl_{(org)} + Me^{2+} + 2Cl^- \quad (2)$$

some examples of how some metals are extracted and re-extracted with different extractants are set forth below:

Extraction $$2R_2NH_2Cl_{(org)} + ZnCl_4^{2-} \rightleftharpoons (R_2NH_2)_2ZnCl_{4(org)} + 2Cl^- \quad (3)$$

$$2R_3NHCl_{(org)} + CoCl_4^{2-} \rightleftharpoons (R_3NH)_2CoCl_{4(org)} + 2Cl^- \quad (4)$$

$$n\ (RO)_3PO_{(org)} + ZnCl_4^{2-} + 2H^+ \rightleftharpoons [(RO)_3PO]_n.H_2ZnCl_{4(org)} \quad (5)$$

$$n\ (RO)_2RPO_{(org)} + ZnCl_4^{2-} + 2H^+ \rightleftharpoons [(RO)_2RPO]_n.H_2ZnCl_{4(org)} \quad (6)$$

Re-Extraction $$(R_2NH_2)_2ZnCl_{4(org)} \rightleftharpoons 2R_2NH_2Cl_{(org)} + Zn^{2+} + 2Cl^- \quad (7)$$

$$(R_3NH)_2CoCl_{4(org)} \rightleftharpoons 2R_3NHCl_{(org)} + Co^{2+} + 2Cl^- \quad (8)$$

$$[(RO)_3PO]_n.H_2ZnCl_{4(org)} \rightleftharpoons n[(RO)_3PO]_{(org)} + Zn^{2+} + 2H^+ + 4Cl^- \quad (9)$$

$$[(RO)_2RPO]_n.H_2ZnCl_{4(org)} \rightleftharpoons n[(RO)_2RPO]_{(org)} + Zn^{2+} + 2H^+ + 4Cl^- \quad (10)$$

If the organic extraction solution is contacted with an aqueous solution of sulphuric acid in the re-extraction, the amine metal chloride complex formed can react with sulphuric acid in the following way:

$$(R_3NH)_2.MeCl_4 + 3H_2SO_4 \rightleftharpoons 2R_3NH.HSO_4 + MeSO_4 + 4HCl \quad (11)$$

Unconsumed amine can further react with sulphuric acid in the following way:

$$R_3NH.Cl + H_2SO_4 \rightleftharpoons R_3NH.HSO_4 + HCl \quad (12)$$

analogous reaction formulae are applicable for other amines and for alkyl phosphates, phosphonates, phosphinates and phosphine oxides.

From the table below examples will be seen of how metals zinc and lead are extracted and re-extracted with said type of extractants.

|  | Extraction | | Re-extraction | | Extraction | | Re-extraction | |
|---|---|---|---|---|---|---|---|---|
|  | [Zn]org g/l | [Zn]aq g/l | [Zn]org g/l | [Zn]aq g/l | [Pb]org g/l | [Pb]aq g/l | [Pb]org ppm | [Pb]aq ppm |
| Primary amine (Primen JMT) | 14 | 45 | 0.5 | 12 | — | — | — | — |
| Secondary amine (Amberlit LA 1) | 18 | 41 | 3.8 | 12 | — | — | — | — |
| Tertiary amine (Alamin 336) | 18 | 32 | 11 | 7.3 | 0.75 | 2.5 | 35 | 47 |
| Quaternary amine | | | | | | | | |

|  | Extraction | | Re-extraction | | Extraction | | Re-extraction | |
| --- | --- | --- | --- | --- | --- | --- | --- | --- |
|  | [Zn]org g/l | [Zn]aq g/l | [Zn]org g/l | [Zn]aq g/l | [Pb]org g/l | [Pb]aq g/l | [Pb]org ppm | [Pb]aq ppm |
| (Aliquat 336) | 24 | 31 | 9.1 | 8.3 | 1.6 | 1.8 | 24 | 60 |
| Alkyl phosphate (TBP) | 31 | 29 | 7.0 | 18 | 0.1 | 3.2 | 1 | 2 |

The extraction solution (the feed) in the zinc extraction contained 65 g/l Zn, 65 g/l Fe and 0.5 M HCl. The re-extraction solution was 1 M $H_2SO_4$. The extraction solution for the lead extraction contained 3.6 g/l Pb, 110 g/l Fe and 0.5 M HCl. The re-extraction solution was 6 M $H_2SO_4$. The low content of lead in the re-extraction is due to lead sulphate precipitation.

In the re-extraction, the aqueous solution can be pure water (or water with a low amount of chloride ions), or an aqueous solution of sulphuric acid. The water can be condensed water from the drive-off operation. This water recirculation can be done without any dangerous increase of its chloride ion content, because the drive-off operation provides an effective separation of water and chloride ions. Alternatively, one can refrain from recycling the water but use fresh water instead. The sulphuric acid in the re-extraction may come from recirculated acid from the drive-off apparatus or fresh make-up concentrated sulphuric acid. The amount of sulphuric acid which is added to the aqueous solution before or after the re-extraction depends on how much metal is to be removed from the system in the form of sulphate, and how much free sulphuric acid one desires in the solution from which water and hydrogen chloride are driven off.

If the content of sulphuric acid is low, e.g., 0.1 M in the aqueous solution to the drive-off operation, large quantities of water must then be evaporated, which results in a large and expensive drive-off step. We therefore prefer to use as strong a solution of sulphuric acid as possible, from the point of view of metal distribution in the re-extraction step and if more sulphuric acid must be added this can be done after the re-extraction. A too concentrated sulphuric acid solution in the re-extraction can decompose the extractant or the solvent, however. We therefore prefer a concentration of 7 M, at most.

Hydrogen chloride and water are driven off by evaporation from the re-extraction solution. The vapour mixture is taken to a distillation column, from which an azeotropic hydrochloric acid solution with about 6 M HCl is produced at the bottom and a hydrogen chloride poor product is taken out at the top.

The sulphuric acid content in the re-extraction solution will increase during evaporation. If the solution is now cooled, metal sulphate will be precipitated if its concentration is near the solubility limit. It may also be the case that the metal sulphate precipitates during the evaporation. The remaining solution is filtered and recycled.

When using an aqueous solution without or with small amounts of sulphuric acid, the sulphuric acid can be supplied to the drive-off apparatus, but can alternatively be supplied to the solution before it reaches said apparatus. If the solubility of the metal sulphate is low, it will precipitate directly upon the addition of sulphuric acid. It is then suitable to separate the precipitated sulphate before the solution is taken into the drive-off apparatus. If the metal sulphate has a good solubility in water, the whole amount is precipitated in the drive-off apparatus, or upon cooling the solution after the drive-off operation.

When the aqueous solution in the re-extraction contains sulphuric acid and the metal sulphates have low solubility a certain quantity of the metal sulphate may precipitate during the re-extraction itself. A further quantity of metal sulphate may be precipitated after evaporation and cooling of the solution as mentioned above.

The organic solution from the re-extraction may contain sulphate bonded to the extracted. See the reaction formulae (11) and (12). If this organic solution is used for extraction of an aqueous solution containing metal chloride complexes and free hydrochloric acid, and if the chloride ion content in the aqueous solution is high, the majority of the sulphate will be replaced by chloride. The process is illustrated by the reaction formula (12), the arrow going to the left being applicable. The departing aqueous solution, the raffinate, will thus be sulphate-bearing.

If sulphate is not desired in the raffinate, the organic solution can be treated in a scrubbing step with a solution made strongly acidic by hydrochloric acid, the sulphate being scrubbed out and replaced by chloride. The sulphate-free organic solution is subsequently refluxed to renewed extraction.

The invention will now be explained with reference to the drawings.

Figure 1:
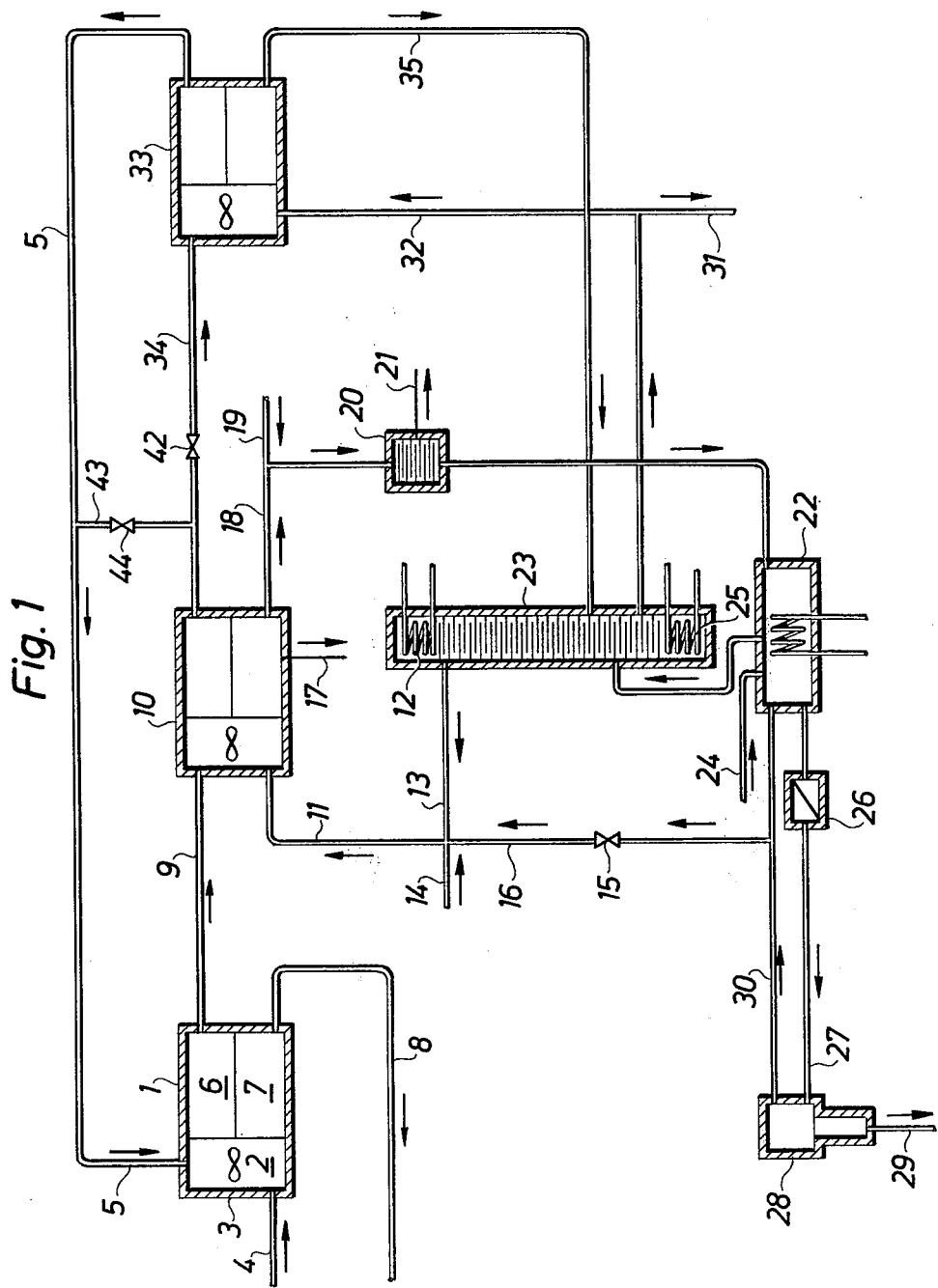
FIG. 1 shows a plant for extracting metals from a metal chloride solution, re-extracting metals with substantially pure water of a sulphuric acid solution, and scrubbing the organic solution with hydrochloric acid.

The plant according to FIG. 1 contains an extraction unit 1 symbolized by a mixer-settler. It should be understood here that all mixer/settlers in the figures can symbolize multiple step processes, e.g. several mixer/settlers in countercurrent, or a pulse column. An aqueous solution is passed through a duct 4 and an organic extraction solution through a duct 5 to a mixing chamber 2, provided with an agitator 3. After mixing, the liquids are allowed to separate as a result of their differences in density. The heavier liquid 7 is the raffinate, and is taken off through a duct 8. The lighter liquid 6 is the organic solution and is taken through a duct 9 to a re-extraction unit 10. The organic solution is mixed here with an aqueous solution supplied through a duct 11. This aqueous solution can be pure water (or water with a low amount of chloride ions) supplied from the condenser 12 through pipe 13 or a sulphuric acid solution mixed to the desired composition of water from the condenser 12, sulphuric acid from pipe 14 and/or mother liquor from the drive-off apparatus supplied through shut-off valve 15 and pipe 16.

The liquids in the re-extraction unit 10 separate because of their different densities. If insoluble metal sulphate is formed, it is taken away through a duct 17. The resulting aqueous solution, now containing soluble metal chloride and hydrochloric acid, is taken out by a pipe 18. A pipe 19, for adding sulphuric acid, is connected to the pipe 18. There is a filter 20 in the pipe 18, for removing metal sulphates 21 having a low solubility which possibly precipitate at the addition of sulphuric acid. From the filter 20 the solution is taken to a drive-off apparatus 22, to which there is connected a distillation column 23. The drive-off apparatus is provided with a supply pipe 24 for sulphuric acid. Thus, sulphuric acid can be added to the aqueous solution after re-extraction through the pipe 19 or the pipe 24 or both.

In the drive-off apparatus 22, hydrogen chloride gas and steam are driven off and are separated in the distillation of column 23 in an azeotropic mixture, which is formed in a re-boiler 25 at the bottom of the column, and a hydrogen chloride poor steam, which is allowed to condense in a condenser 12 at the top of the column. Crystallized metal sulphate and mother liquor are taken from the drive-off apparatus 22, via a cooler 26 and a pipe 27, to a separator 28 where crystallized metal sulphate is taken off via a pipe 29. The mother liquor is recycled via a pipe 30 to the drive-off apparatus 22. A part of the mother liquor can be used to make the aqueous solution for re-extraction acidic via the shut-off valve 15 and pipe 16.

If any re-extracted metal forms a sulphate with a very low solubility, this can practically completely be precipitated by the addition of sulphuric acid through the pipe 19 and separated in the filter 20. The separator 28 then only needs to be used infrequently and can possibly be dispensed with.

A part of the hydrochloric acid solution formed in the reboiler 25, having a concentration of about 6 M, is taken from the plant through a duct 31. The remainder is taken through a duct 32 to a scrubbing unit 33, symbolized by a mixer/settler. Here the hydrochloric acid solution is mixed with the organic solution which, via a duct 34, is transferred from the re-extraction unit 10. The sulphate content of the extractant is hereby replaced by chloride. The sulphate-free organic solution is recycled through the duct 5 to the extraction unit 1. The hydrochloric acid solution, now containing sulphate ions, is led through a duct 35 to the distillation column 23 where sulphate is separated from chloride.

Figure 2:
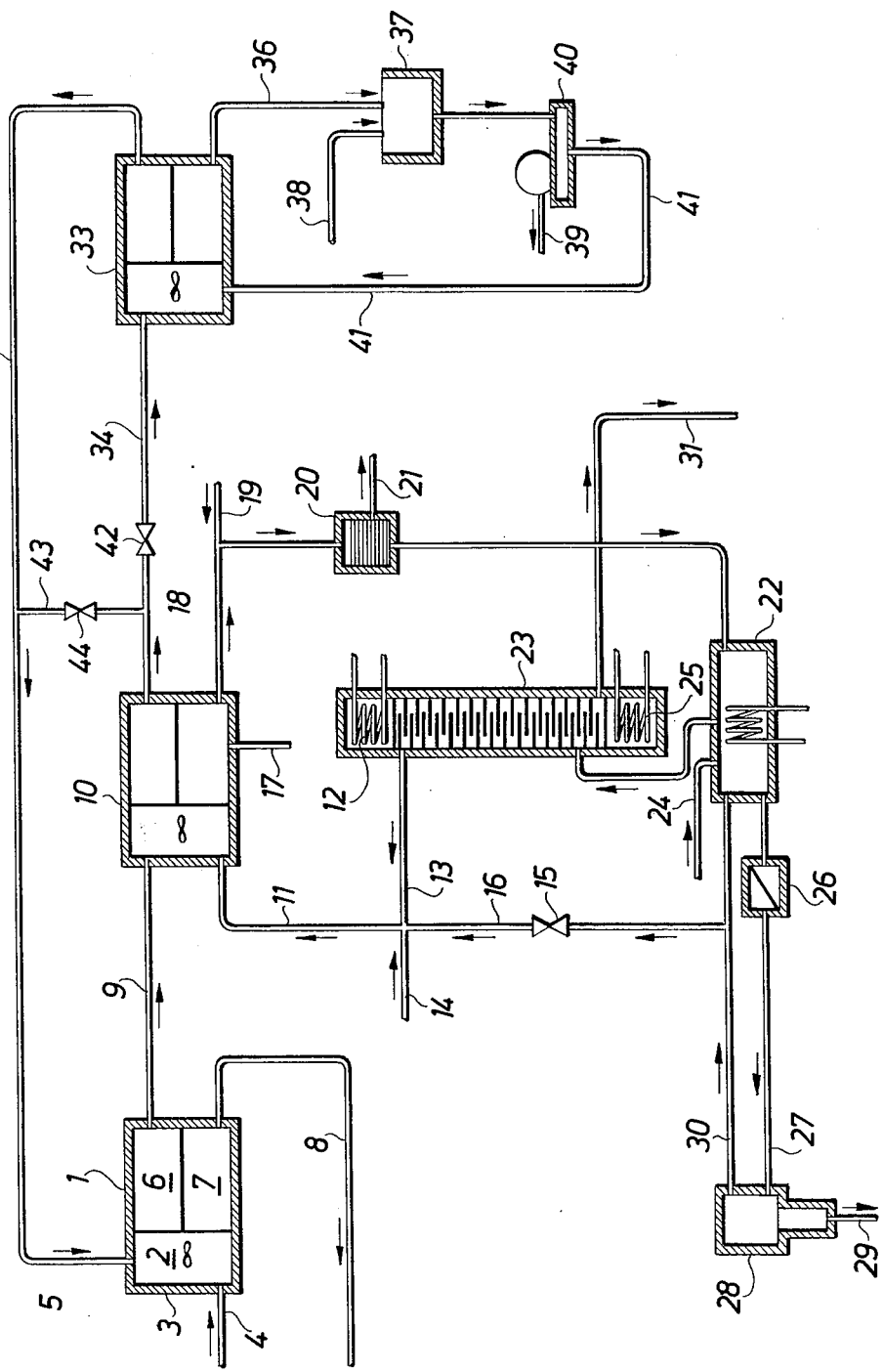
FIG. 2 shows a plant substantially similar to that in FIG. 1, but where the scrubbing of the organic solution is carried out somewhat differently.

The plant according to FIG. 2 is to a large extent similar to the plant according to FIG. 1, and the same reference numerals have been used for corresponding parts. The scrubbing solution departing from the scrubbing unit 33 is treated differently, however. According to FIG. 2 the scrubbing solution is taken through a duct 36 to a tank 37, to which is also supplied a solution of calcium hydroxide $Ca(OH)_2$ and calcium chloride $CaCl_2$ in equal molar quantities via a duct 28. Gypsum $CaSO_4 \cdot 2 H_2O$ is hereby precipitated, the content of hydrochloric acid increases, and the content of sulphuric acid decreases. The gross reaction for the whole of the scrubbing cycle will be as follows:

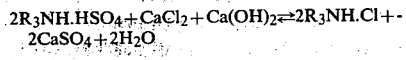
(13)

The organic solution can now be recycled to the extraction unit 1 without the raffinate being contaminated by sulphate. The precipitated calcium sulphate 39 is separated in a filter 40. The resulting hydrochloric acid solution is taken through a duct 41 to the scrubbing unit 33 to be used for scrubbing out sulphate from the organic solution.

In a plant according to FIG. 1 or 2, a shut-off valve 42 can be arranged in the duct 34. A duct 43 with a shut-off valve 44 has furthermore been arranged between the ducts 34 and 5. The scrubbing unit 33 can be bypassed by means of the valve 44 so that the solution departing from the re-extraction unit 10 is directly recycled to the extraction unit 1. This procedure can be used if sulphate content in the raffinate 8 coming from the extraction unit 1 can be accepted.

Figure 3:
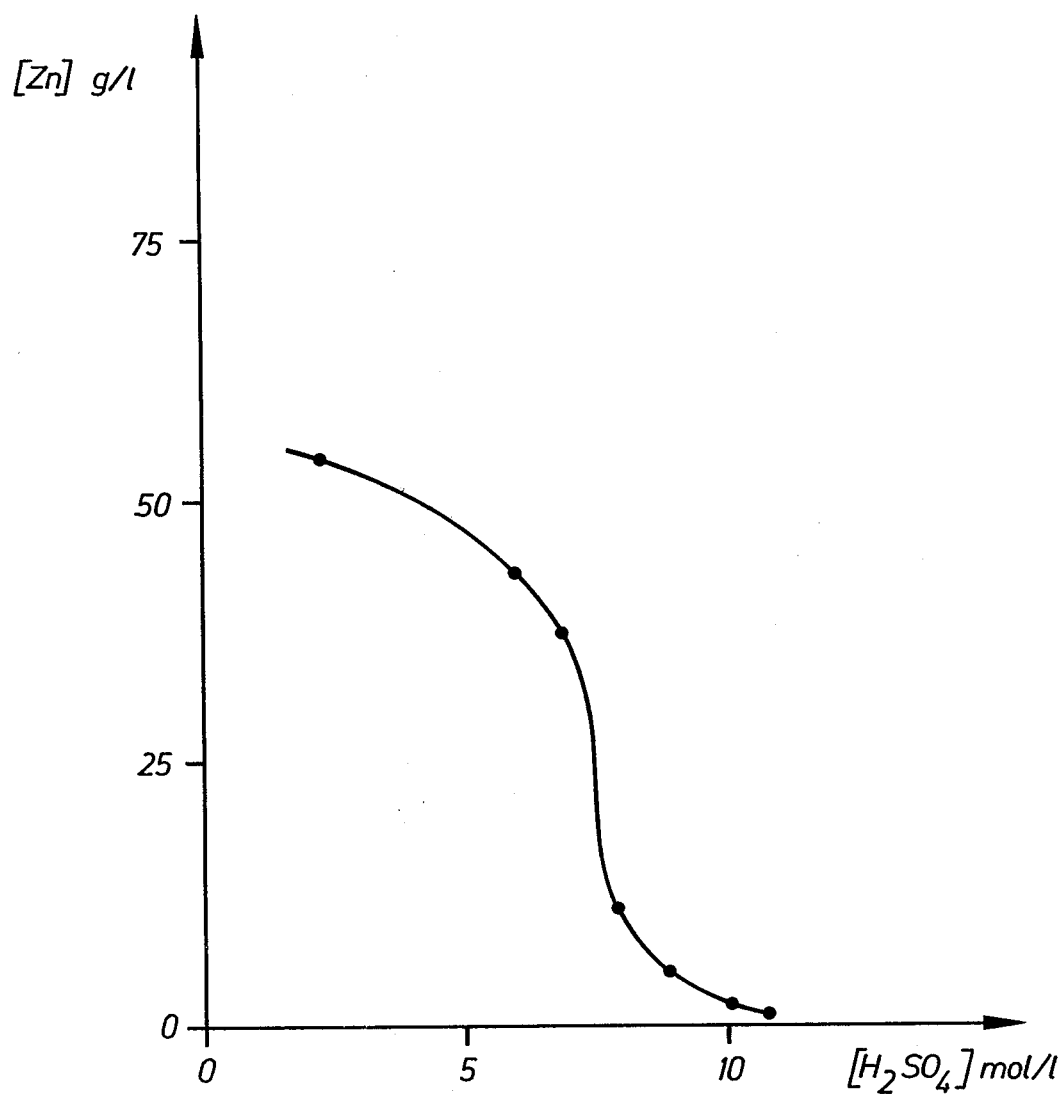
FIG. 3 shows a diagram over the solubility of zinc sulphate as a function of the sulphuric acid content.

FIG. 3 shows how the solubility for zinc sulphate, expressed as grams of zinc per liter, varies with the sulphuric acid content, expressed as moles per liter, in a zinc sulphate solution made acidic by sulphuric acid. As is apparent, the solubility graph has a portion with severe inclination in its middle section, i.e. a minor alteration of the sulphuric acid content results in a heavy alteration in the solubility of the zinc sulphate. Accordingly, an increase of the sulphuric acid content from 7 to 8 moles per liter results in a solubility decrease of the zinc sulphate from 35 to 10 grams per liter of zinc. In the drive-off operation it is desirable to work within this range having the severest inclination on the solubility graph, because precipitation of metal sulphate can be achieved with minimum evaporation in the drive-off apparatus 22. Most metal sulphates have solubility graphs similar to the one shown in FIG. 3. We therefore prefer to use a sulphuric acid solution entering into the drive-off apparatus 22 with a concentration of up to 7 moles per liter and to drive off so much water that the concentration of the sulphuric acid rises to 7–10 moles per liter.

EXAMPLE 1

An exhausted pickling bath liquor contained 5 g/l Pb, 100 g/l Fe and 20 g/l HCl. The liquor was supplied to an extraction column at the rate of 2.5 m³/h. It was mixed with a kerosene solution containing 25% by weight of "Aliquat" 336 (a quaternary amine from General Mills Chemicals Inc.), which was supplied at the rate of 7.5 m³/h. After extraction, the raffinate contained 0.005 g/l Pb, 95 g/l Fe, and 20 g/l HCl and the organic solution 1.7 g/l Pb, 1.7 g/l Fe and 29 g/l HCl. It was mixed in a re-extraction unit with a 6 M aqueous solution of sulphuric acid which also contained 5.5 g/l HCl. The sulphuric acid solution was supplied at a rate of 15 m³/h. Lead was precipitated almost in its entirety, and was taken from the settler section as lead sulphate at a rate of 14.6 kg/h. After re-extraction the sulphuric acid solution contained 21 g/l Fe and 15 g/l HCl.

The sulphuric solution was taken to a drive-off apparatus containing a packed column, where hydrogen chloride and water were driven off to such an extent that the departing solution contained 7 M sulphuric acid, 5.5 g/l HCl, and 24.5 g/l Fe. The solution was cooled to 20° C., and taken to a crystallizer where iron sulphate $Fe_2(SO_4)_3$ crystallized at a rate of 37 kg/h. The mother liquor was replenished with water at a rate of about 2 m³/h, and with sulphuric acid at a rate of 57 kg/h corresponding to the precipitated amount of lead sulphate and ferric sulphate. It was subsequently recycled to renewed re-extraction. Its sulphuric acid content was then 6 M.

The organic solution from the re-extraction contained 0.0015 g/l Pb, 0.005 g/l Fe, 59 g/l $H_2SO_4$ and 7 g/l HCl. Cl⁻ had thus been partly replaced by $HSO_4^-$. In order to scrub out the latter ion, the organic solution was treated in a scrubbing unit with a part of the hydrochloric acid solution with the concentration of 6 M obtained from the re-boiler. This hydrochloric acid solution was formed at the rate of 0.80 m³/h, and 0.64 m³/h were taken to the scrubbing unit, while 0.16 m³/h were taken away from the plant. During scrubbing the hydrogen chloride content of the hydrochloric acid solution dropped from 219 g/l to 37 g/l, and it absorbed 323 g/l sulphuric acid instead. This solution was taken to the drive-off apparatus for separating hydrochloric acid and sulphuric acid.

The organic solution from the scrubber unit was depleted of sulphate, and was recycled to renewed extraction.

EXAMPLE 2

An exhausted pickling bath liquor contained 100 g/l zinc, 50 g/l iron, and 18 g/l HCl. In a multi-step mixer/-settler it was mixed with a kerosene solution containing 75% by weight tributyl phosphate (TBP). The flow relationship between the organic solution and the aqueous solution was adjusted to suit the maximum loading capacity of the organic solution +/. With 100 g/l in the feed solution, a flow relationship of 3.5:1 was required. +/(about 30 g/l Zn) and the zinc content of the aqueous solution.

For re-extracting zinc, the extract was contacted with about 3 M $H_2SO_4$ in a four step mixer/settler-battery. A zinc content of 20 g/l in the re-extraction solution was hereby attained, with a flow relationship of 1:1.5. Hydrochloric acid was also scrubbed out together with zinc, while sulphuric acid was transferred to the organic solution so that its content in the aqueous solution dropped by about 0.1 molar unit. The content of sulphuric acid in the organic extract became thereby about 0.2 M $H_2SO_4$. Sulphuric acid, stoichiometrically equivalent to zinc was added to the re-extraction solution and then it was heated in a packed column so that hydrogen chloride and water were driven off. From the distillation column a bottom product containing 6 M hydrochloric acid was produced. This could be used as pickling acid, for example. A liquid phase was taken from the drive-off apparatus containing about 0.2 M hydrochloric acid and about 8 M sulphuric acid.

In cooling the solution, the solubility of zinc sulphate was exceeded, and it therefore crystallized and was separated by centrifuging. The mother liquor was diluted with a quantity of water equal to the amount evaporated in the drive-off apparatus. This solution was recycled to be used as re-extraction solution.

The organic solution was recycled to renewed extraction of zinc. The accompanying sulphuric acid was hereby lost to the aqueous solution in exchange for metal chloride. The outgoing raffinate, therefore contained about 0.7 M sulphate.

EXAMPLE 3

An exhausted pickling bath liquor contained 65 g/l zinc, 100 g/l iron and 35 g/l HCl. In an extraction apparatus of the pulse column type it was contacted with a kerosene solution containing 75% by weight tributyl phosphate (TBP). The flow ratio between the organic solution and the aqueous solution was adjusted to the maximum loading capacity of the organic solution (about 30 g/l Zn) and the zinc content of the aqueous solution. With 65 g/l in the feed solution, a flow ratio of 2.4:1 was required.

For the re-extraction of zinc, the extract was contacted with pure water in a five step mixer/settler battery. A zinc content of 25 g/l was hereby attained in the re-extraction solution for a flow ratio of 1:1.1. Hydrochloric acid and co-extracted iron were scrubbed out together with zinc.

The re-extracted solution was taken to a drive-off apparatus. The gas phase from this apparatus was taken to a distillation column. Condensed water was taken from the top of the column. The water was used as fresh re-extraction solution. From the bottom of the column a flow consisting of 6 M HCl was taken out and used as fresh pickling acid.

The sulphuric acid content in the drive-off apparatus was kept constant at about 9 M. The zinc content of the re-extraction solution precipitated as zinc sulphate. The crystals were separated by centrifuging from a flow from the drive-off apparatus. The mother liquor was recycled to the drive-off apparatus. By cooling the crystal slurry, the degree of precipitation could be increased. Sulphuric acid was added to an amount equivalent to the metal sulphate and sulphuric acid removed, for retaining the sulphuric acid content in the drive-off apparatus.

The organic solution was recycled to be used again for the extraction of zinc.

For an incoming flow of about 1 m³/h exhausted pickling bath liquor, the described operation resulted in 160 kg/h $ZnSO_4$ and 540 kg/h 6 M HCl. The exhausted pickling bath liquor was purified from its zinc content with a yield of about 99.8%.

What is claimed is:

1. A process for the re-extraction of a metal from an organic extraction solution in which the metal is presented as a metal chloride complex bonded to an extractant, characterized in contacting the organic extraction solution with an aqueous solution to transfer metal ions and chloride ions to the aqueous solution, adding a sulphuric acid solution to the aqueous solution, either before or before and after the contact with the organic extraction solution, heating the thusly acidified aqueous solution to drive off hydrogen chloride and water, crystallizing metal sulphate from the concentrated solution thus produced, and separating the crystallized metal sulphate from the solution.

2. A process as claimed in claim 1, comprising recirculation of condensed water and sulphuric acid from the drive-off apparatus to the aqueous solution for re-extraction.

3. A process as claimed in claim 1, characterized in that sufficient water is driven off from the sulphuric acid solution in the drive-off apparatus so that the concentration of sulphuric acid therein increases to 7–10 M.

4. A process as claimed in claim 1, characterized in contacting the organic extraction solution with an aqueous solution of sulphuric acid having a concentration up to 7 M.

5. A process as claimed in claim 1, in which the organic extraction solution contains a metal, the sulphate of which has low solubility in water, characterized in contacting the organic extraction solution with an aqueous solution of sulphuric acid in a re-extraction unit of the mixer/settler type, removing the precipitated metal sulphate from the settler section, and driving off hydrogen chloride from the sulphuric acid solution relieved of precipitated sulphate.

6. A process as claimed in claim 1, characterized in contacting the re-extracted organic solution with the aqueous solution of hydrochloric acid formed in the drive-off operation, so as to transfer sulphate from the organic solution to the aqueous solution, and conveying the resulting aqueous solution to the drive-off operation, for separating sulphuric acid and hydrochloric acid.

7. A process as claimed in claim 1, characterized in contacting the re-extracted organic solution with an aqueous solution of hydrochloric acid, adding calcium hydroxide and calcium chloride in equal molar amounts to the aqueous solution thus formed, for precipitation of calcium sulphate, removing precipitated calcium sulphate from the solution, and returning the solution for reuse for contacting the re-extracted organic solution.

* * * * *